(12) United States Patent
Nagimov et al.

(10) Patent No.: US 11,728,677 B2
(45) Date of Patent: Aug. 15, 2023

(54) INTEGRATED ENERGY STORAGE SYSTEM INCLUDING A THERMAL ENERGY STORAGE COUPLED WITH A LIQUID METAL BATTERY STORAGE AND A CRYOGENIC ENERGY STORAGE

(71) Applicant: Microsoft Technology Licensing, LLC, Redmond, WA (US)

(72) Inventors: Ruslan Nagimov, Redmond, WA (US); Ehsan Nasr Azadani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 17/245,196

(22) Filed: Apr. 30, 2021

(65) Prior Publication Data
US 2022/0352750 A1    Nov. 3, 2022

(51) Int. Cl.
*G06F 1/30* (2006.01)
*H02J 15/00* (2006.01)
(Continued)

(52) U.S. Cl.
CPC .............. *H02J 15/00* (2013.01); *G05B 15/02* (2013.01); *G06F 1/30* (2013.01); *H01M 10/39* (2013.01);
(Continued)

(58) Field of Classification Search
CPC . H02J 15/00; H02J 7/0068; H02J 9/06; G05B 15/02; G06F 1/30; H01M 10/39; H01M 2220/10
See application file for complete search history.

(56) References Cited

U.S. PATENT DOCUMENTS 10,461,311 B1 * 10/2019 Vissers ................. H01M 10/48
2012/0216520 A1    8/2012 Chen et al.
(Continued)

FOREIGN PATENT DOCUMENTS

CN   104047818 B   8/2016
CN   108493522 B   11/2019

OTHER PUBLICATIONS

"International Search Report and Written Opinion Issued in PCT Application No. PCT/US22/023756", dated Jul. 27, 2022, 11 Pages.
(Continued)

*Primary Examiner* — Gary Collins
(74) *Attorney, Agent, or Firm* — Ranjeev Singh; Singh Law, PLLC

(57) ABSTRACT

Integrated energy storage system including a thermal energy storage coupled with a liquid metal battery storage and a cryogenic energy storage and related methods are described. An example integrated energy storage system includes a liquid metal battery storage, a cryogenic energy storage configured to store energy using a liquefied cryogen, a thermal energy storage, and a control system. The control system is configured to cause selective transfer of heat from the thermal energy storage to at least one battery unit associated with the liquid metal battery storage. The control system is configured to during a first mode associated with the cryogenic energy storage, cause selective transfer of heat from the cryogenic energy storage to the thermal energy storage. The control system is configured to during a second mode associated with the cryogenic energy storage, cause selective transfer of heat from the thermal energy storage to the cryogenic energy storage.

20 Claims, 6 Drawing Sheets

(51) Int. Cl.
   *G05B 15/02*   (2006.01)
   *H01M 10/39*   (2006.01)
   *H02J 7/00*    (2006.01)
   *H02J 9/06*    (2006.01)

(52) U.S. Cl.
   CPC .............. *H02J 7/0068* (2013.01); *H02J 9/06* (2013.01); *H01M 2220/10* (2013.01)

(56) References Cited

U.S. PATENT DOCUMENTS

| | | | | |
|---|---|---|---|---|
| 2015/0300209 | A1* | 10/2015 | Goldman | F01K 3/08 60/659 |
| 2019/0356023 | A1* | 11/2019 | Tenorio | H01M 10/39 |
| 2020/0056511 | A1* | 2/2020 | Conlon | F25J 1/0236 |

OTHER PUBLICATIONS

"Eaton and Microsoft's EnergyAware UPS technology pilot project", Retrieved from: https://web.archive.org/web/20201031020026/https://www.eaton.com/us/en-us/products/backup-power-ups-surge-it-power-distribution/backup-power-ups/dual-purpose-ups-technology.html, Mar. 29, 2021, 6 pages.

Al-Jabarti, et al., "Data Center Flooded Lead Acid Battery Early Degradation Causes, Analysis, and Mitigation", In Proceedings of IEEE International Telecommunications Energy Conference (INTELEC), Oct. 7, 2018, 4 Pages.

Green, Anthony, "The characteristics of the nickel-cadmium battery for energy storage", In Journal of Power Engineering Journal ,vol. 13. Issue 3, Jun. 1999, pp. 117-121.

Lyu, et al., "Aging mechanism analysis and its impact on capacity loss of lithium ion batteries", In Proceedings of 14th IEEE Conference on Industrial Electronics and Applications (ICIEA), Jun. 19. 2019, pp. 2148-2153.

Mia, et al., "LiFePO4 Battery Characteristic Analysis and Capacity Loss Prediction for Constant Current Cycling", In Proceedings of IEEE Vehicle Power and Propulsion Conference (VPPC), Oct. 14, 2019, 5 Pages.

"Batteries for clean energy", Retrieved from: https://web.archive.org/web/20210505081753/https://ambri.com/technology/, May 5, 2021, 11 Pages.

"Thermal Energy Storage System", Retrieved from: https://www.sciencedirect.com/topics/engineering/thermal-energy-storage-system, Retrieved Date: May 11, 2021, 8 Pages.

Hüttermann, et al., "Investigation of a liquid air energy storage (LAES) system with different cryogenic heat storage devices", In Proceedings of 10th International Conference on Applied Energy, Aug. 22, 2018, pp. 4410-4415.

* cited by examiner

INTEGRATED ENERGY STORAGE SYSTEM INCLUDING A THERMAL ENERGY STORAGE COUPLED WITH A LIQUID METAL BATTERY STORAGE AND A CRYOGENIC ENERGY STORAGE

BACKGROUND

Datacenter deployment is accelerating in order to meet rising demand for computing, communication, and storage resources. However, efficient scaling of datacenter capacity is being constrained by the traditional architectures used for the distribution, delivery, and storage of energy. In addition, datacenters face significant costs and inefficiencies related to energy storage. In order to meet high availability requirements, uninterruptible power supply (UPS) systems and diesel generators are used for short-term and long-term energy storage, respectively. UPS systems are typically based on traditional rechargeable batteries and therefore have limited life due to their inherent capacity loss because of the charging and discharging cycles. Moreover, diesel generators, which are used for standby power generation, operate at low efficiencies, require regular maintenance, and may negatively impact the environment because of the reliance of an external supply of diesel fuel.

Thus, there is a need for improved energy storage systems and methods associated with datacenters.

SUMMARY

In one example, the present disclosure relates to an integrated energy storage system including a liquid metal battery storage including at least one battery unit configured to provide backup electrical power to a datacenter. The integrated energy storage system may further include a cryogenic energy storage configured to store energy using a liquefied cryogen. The integrated energy storage system may further include a thermal energy storage, and a control system, coupled to both the liquid metal battery storage and the cryogenic energy storage. The control system may be configured to cause selective transfer of heat from the thermal energy storage to the at least one battery unit associated with the liquid metal battery storage when at least one condition for maintaining an operational status of the at least one battery unit in order to provide the backup electrical power to the datacenter is met. The control system may further be configured to during a first mode associated with the cryogenic energy storage, cause selective transfer of heat from the cryogenic energy storage to the thermal energy storage. The control system may further be configured to during a second mode, different from the first mode, associated with the cryogenic energy storage, cause selective transfer of heat from the thermal energy storage to the cryogenic energy storage.

In another example, the present disclosure relates to a method for operating an integrated thermal energy system comprising: (1) a liquid metal battery storage including at least one battery unit configured to provide backup electrical power to a datacenter, (2) a cryogenic energy storage configured to store energy using a liquefied cryogen, and (3) a thermal energy storage coupled to both the liquid metal battery storage and the cryogenic energy storage. The method may include selectively transferring heat from the thermal energy storage to the at least one battery unit associated with the liquid metal battery storage when at least one condition for maintaining an operational status of the at least one battery unit in order to provide the backup electrical power to the datacenter is met, otherwise selectively transferring heat from the at least one battery unit to the thermal energy storage. The method may further include during a first mode associated with the cryogenic energy storage, selectively transferring heat from the cryogenic energy storage to the thermal energy storage. The method may further include during a second mode, different from the first mode, associated with the cryogenic energy storage, selectively transferring heat from the thermal energy storage to the cryogenic energy storage.

In yet another example, the present disclosure relates to an integrated energy storage system including a liquid metal battery storage configured to receive electrical power from an electrical grid and provide backup electrical power to a datacenter, where the liquid metal battery storage comprises at least one battery unit configured to provide the backup electrical power when heated to a temperature equal to or above an operating setpoint temperature associated with the at least one battery unit. The integrated energy storage system may further include a cryogenic energy storage configured to receive electrical power from the grid, store energy using a liquefied cryogen, and provide electrical power to the datacenter. The integrated energy storage system may further include a thermal energy storage, and a control system, coupled to both the liquid metal battery storage and the cryogenic energy storage. The control system may be configured to monitor temperature of a fluid configured to transfer heat to and from the thermal energy storage, and if the temperature of the fluid is higher than the operating setpoint temperature associated with the at least one battery unit then selectively turn on a circulation pump associated with the thermal energy storage to transfer heat using the fluid to the at least one battery unit otherwise selectively turn on the circulation pump to transfer heat using the fluid from the at least one battery unit to the thermal energy storage. The control system may further be configured to during a charge mode associated with the cryogenic energy storage, using at least one circulation pump, selectively transfer heat from the cryogenic energy storage to the thermal energy storage. The control system may be configured to during a discharge mode associated with the cryogenic energy storage, using at least one circulation pump, selectively transfer heat from the thermal energy storage to the cryogenic energy storage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
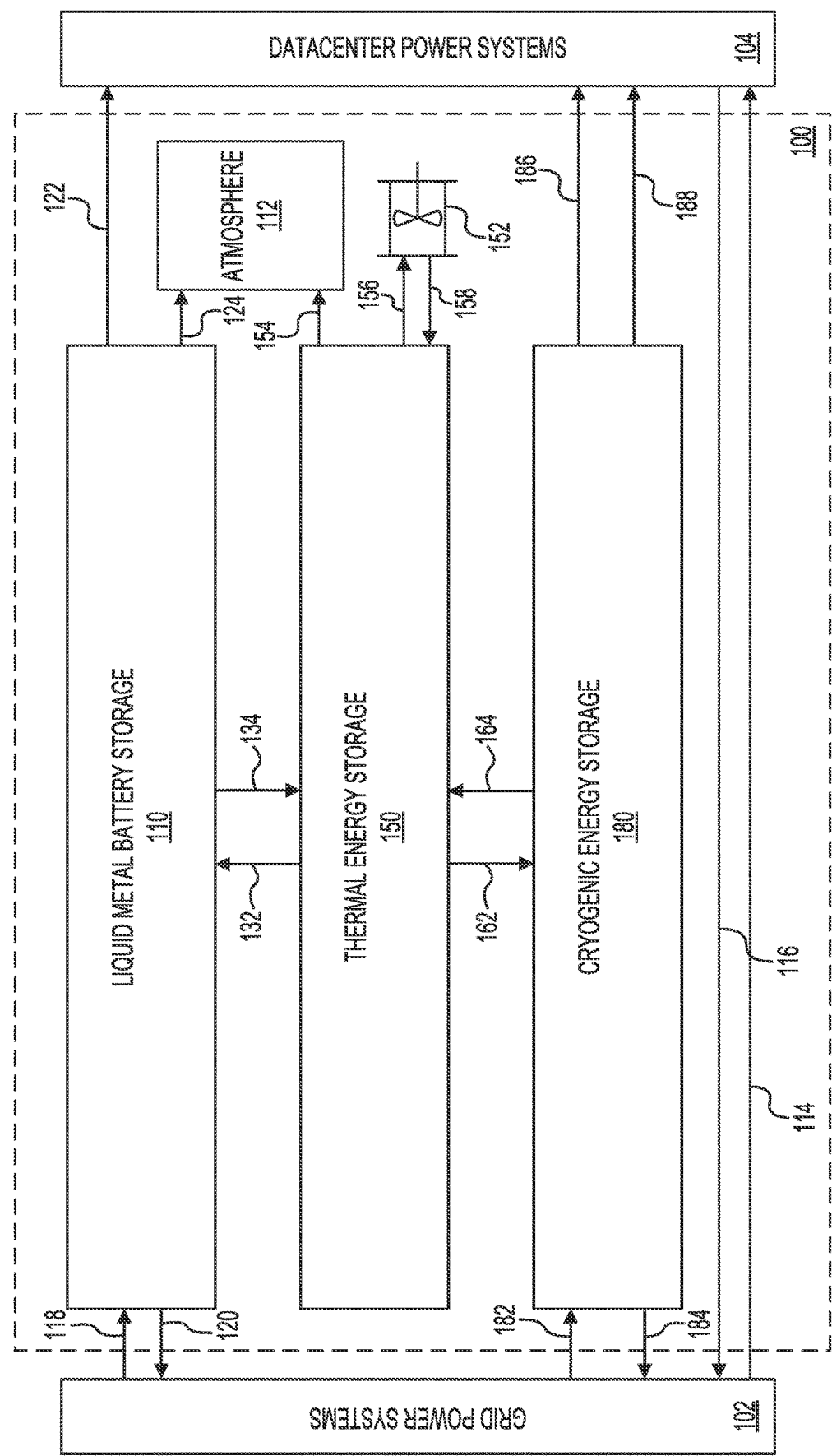
FIG. 1 shows a diagram of an integrated energy storage system including a thermal energy storage integrated with a liquid metal battery storage and a cryogenic energy storage in accordance with one example.

Examples described in this disclosure relate to an integrated energy storage system including a thermal energy storage coupled with a liquid metal battery storage and a cryogenic energy storage. Because of some of the disadvantages of the traditional energy storage systems noted earlier, such systems are often used only as a backup solution in case of the loss of the grid power. The inclusion of the thermal energy storage as part of the integrated energy storage system increases the round-trip efficiencies (e.g., the ratio of the energy output by a storage and the energy input to the storage) of both the liquid metal battery storage and the cryogenic energy storage. Unlike conventional batteries, the batteries associated with the liquid metal battery storage need to be maintained at a certain operating temperature. Similarly, without the thermal energy storage the excess heat generated by the cryogenic energy storage may be wasted, resulting in a lower round-trip efficiency of the cryogenic energy storage. Advantageously, the integrated energy storage system including a thermal energy storage coupled with a liquid metal battery storage and a cryogenic energy storage increases the round-trip efficiency of both the liquid metal battery storage and the cryogenic energy storage.

Moreover, the deployment of liquid metal batteries as a short-term energy storage solution into datacenters may resolve the limitations of the traditional battery technology currently utilized for the uninterruptible power systems (UPSs). The use of the liquid metal battery storage may virtually eliminate capacity loss associated with age cycle count. In addition, the use of the liquid metal battery storage may remove the barriers limiting utilization of the UPSs and enables frequent grid-interactive operations. Moreover, the use of the liquid metal battery storage may reduce the environmental hazards associated with traditional batteries.

In addition, the deployment of cryogenic energy storage may remove the limitations of the traditional diesel generator powered backup systems in several ways. First, the deployment of the cryogenic energy storage may allow a datacenter to operate continuously in case of loss of grid power without use of diesel generators and reduces maintenance and operational costs associated with the diesel generators. Second, the deployment of the cryogenic energy storage may reduce the dependence on diesel fuel, allowing long-term storage to be "recharged" using electrical power. Third, the deployment of the cryogenic energy storage may allow the datacenters to utilize cryogenic energy storage for grid-interactive operations in an environment of imbalanced peak demand and renewable energy production. Fourth, the deployment of the cryogenic energy storage may reduce the footprint of the carbon-free long-term energy storage system. Fifth, the deployment of the cryogenic energy storage may allow extending datacenter deployments to regions without existing power transmission infrastructure by relying on intermittent renewable energy sources. Finally, the deployment of the cryogenic energy storage may allow stored cryogens to be used in datacenters for cryogenically cooled superconducting and quantum computing systems.

Integration of the liquid metal battery storage and the cryogenic energy storage using a thermal energy storage provides additional advantages. The integrated energy storage system may reduce the frequency of required charge/discharge cycles of the liquid metal batteries in order to maintain their high operating temperature by utilizing the recovered compression heat from the cryogenic energy storage, when available. In addition, the integrated energy storage system may reduce the frequency of required charge/discharge cycles of the cryogenic energy storage by utilizing the recovered heat generated by charge/discharge cycles of the liquid metal batteries, when available. Moreover, the integrated energy storage system may support both short-term and long-term energy storages for grid-interactivity without the degradation of the storage capacities with an increased round-trip efficiency of both energy storage systems. Finally, the integrated energy storage system may allow the utilization of waste "cold" produced by the cryogenic energy storage for datacenter cooling.

FIG. 1 shows a diagram of an integrated energy storage system 100 including a thermal energy storage 150 integrated with a liquid metal battery storage 110 and a cryogenic energy storage 180 in accordance with one example. Liquid metal battery storage 110 may be coupled to grid power systems 102 to receive electrical power via link 118. In addition, liquid metal battery storage 110 may be coupled to grid power systems 102 via link 120 to allow for grid-interactive actions, including providing power back to the grid. Liquid metal battery storage 110 may further be coupled to datacenter power systems 104 to provide electrical power (e.g., backup electrical power) via link 122. As used herein the term "link" includes, but is not limited to, one or more cables and other types of connecting elements that may be used to establish an electrical connection between two or more components.

With continued reference to FIG. 1, in this example, liquid metal battery storage 110 may be implemented using multiple liquid metal battery units. Each battery unit may be formed by including, in a housing, a liquid calcium alloy anode, an electrolyte (e.g., a molten salt electrolyte), and a cathode including antimony. In this example, liquid metal battery storage 110 may be inert until it is heated to a certain temperature (e.g., 500 degrees Centigrade or above). Heat may be transferred to battery units included in liquid metal battery storage 110 via pipe 134, which may receive the heat in the form of a heated liquid from thermal energy storage 150. The battery units may provide cooled gas or liquid back to thermal energy storage 150 via pipe 132. Any heat that may leak from liquid metal battery storage 110 despite thermal insulation may be released to atmosphere 112 via pipe 124. As used herein the term "pipe" includes, but is not limited to, any pipe structures, connectors, joints, or other pipe related elements that may be used to move any gas, air, any liquid, or water between at least two or more components. As used herein the term "liquid metal battery storage" includes, but is not limited to, any chemical energy storage in which energy is stored using elements that undergo a chemical reaction during charging or discharging of the chemical energy storage.

Still referring to FIG. 1, thermal energy storage 150 may also be coupled to cryogenic energy storage 180 via pipes 162 and 164. Pipe 162 may be used to supply a hot gas or a hot liquid to cryogenic energy storage 180 and pipe 164 may be used to receive cooled fluid (liquid or gas) from cryogenic energy storage 180. Any heat that may leak from thermal energy storage 150 despite thermal insulation may be released to atmosphere 112 via pipe 154. Thermal energy storage 150 may also be coupled to air cooler 152 via pipes 156 and 158. Pipe 156 may be used to release any excess heat generated by thermal energy storage. In this example, thermal energy storage 150 may be implemented using one or more storage tanks including a substance that could be heated or cooled based on the heat exchange with liquid metal battery storage 110 and cryogenic energy storage 180.

With continued reference to FIG. 1, cryogenic energy storage 180 may be coupled to grid power systems 102 to receive electrical power via link 182. In addition, cryogenic energy storage 180 may be coupled to grid power systems 102 via link 184 to allow for grid-interactive actions, including providing power back to the grid. Cryogenic energy storage 180 may further be coupled to datacenter power systems 104 to provide electrical power (e.g., backup electrical power) via links 186 and 188. In this example, cryogenic energy storage 180 may store energy in the form of cryogenically cooled gases, including air or nitrogen. As used herein the term "cryogenic energy storage" includes, but is not limited to, any type of energy storage in which a phase of a fluid is changed from gas to liquid and then back to gas. Although FIG. 1 shows a certain number of components of integrated energy storage system 100 arranged in a certain manner, there could be more or fewer number of components arranged differently.

Figure 2:
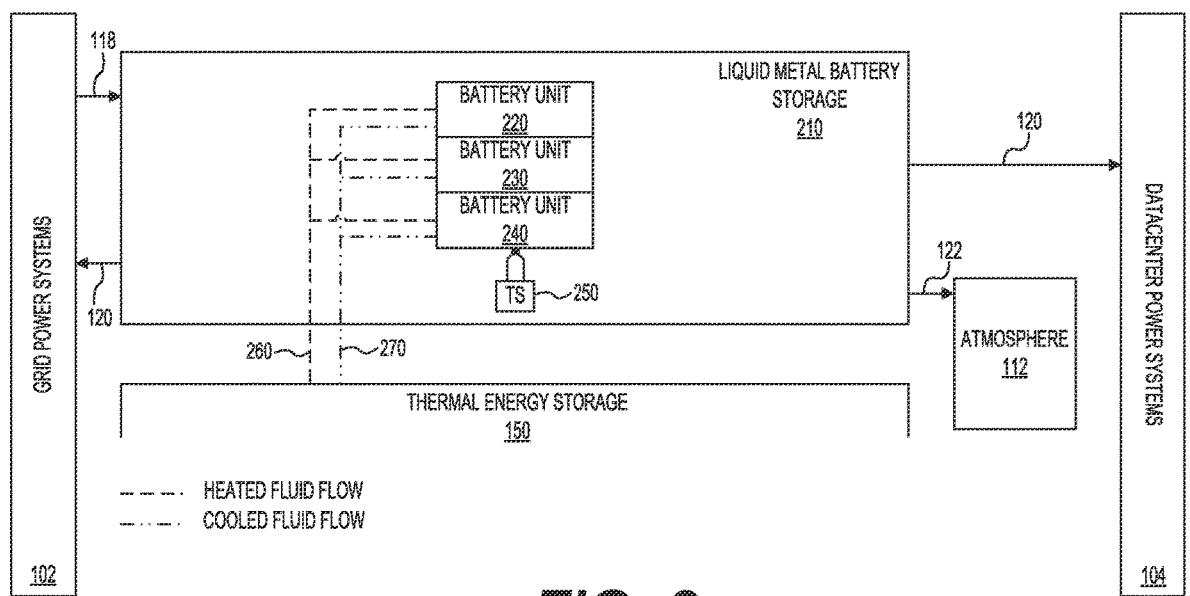
FIG. 2 shows a diagram of a liquid metal battery storage in accordance with one example.

FIG. 2 shows a diagram of a liquid metal battery storage 210 in accordance with one example. Liquid metal battery storage 210 may include as many battery units as may be needed to generate backup power to provide power to datacenter power systems 104, which in turn may be used to supply power to the various computing, storage, networking, and other components in the datacenter. In this example, liquid metal battery storage 210 may include battery units 220, 230, and 240. Battery units 220, 230, and 240 may be interconnected and arranged in a manner to generate the requisite amount of backup power. Liquid metal battery storage 210 may further include a temperature sensor (TS) 250. Temperature sensor (TS) 250 may be configured to sense a temperature of each of battery units 220, 230, and 240 and communicate the sensed temperature to a controller associated with liquid metal battery storage 210. The controller (not shown) may further format and communicate the sensed temperature to a controller associated with thermal energy storage 150. Each of battery units 220, 230, and 240 may be formed by including, in a housing, a liquid calcium alloy anode, an electrolyte (e.g., a molten salt electrolyte), and a cathode including antimony. In this example, each of battery units 220, 230, and 240 may be inert until they are heated to a certain temperature (e.g., 500 degrees Centigrade or above). Heat may be transferred to battery units 220, 230, and 240 included in liquid metal battery storage 210 via pipe 260 (similar to pipe 134 of FIG. 1), which may receive the heat through a heated fluid from thermal energy storage 150. Battery units 220, 230, and 240 may transfer heat via the liquid back to thermal energy storage 150 using pipe 270 (similar to pipe 132 of FIG. 1). Although FIG. 2 shows a certain number of components of liquid metal battery storage 210 arranged in a certain manner, there could be more or fewer number of components arranged differently. As an example, although FIG. 2 shows one temperature sensor, multiple temperature sensors may be used to sense the temperature of the battery units.

Figure 3:
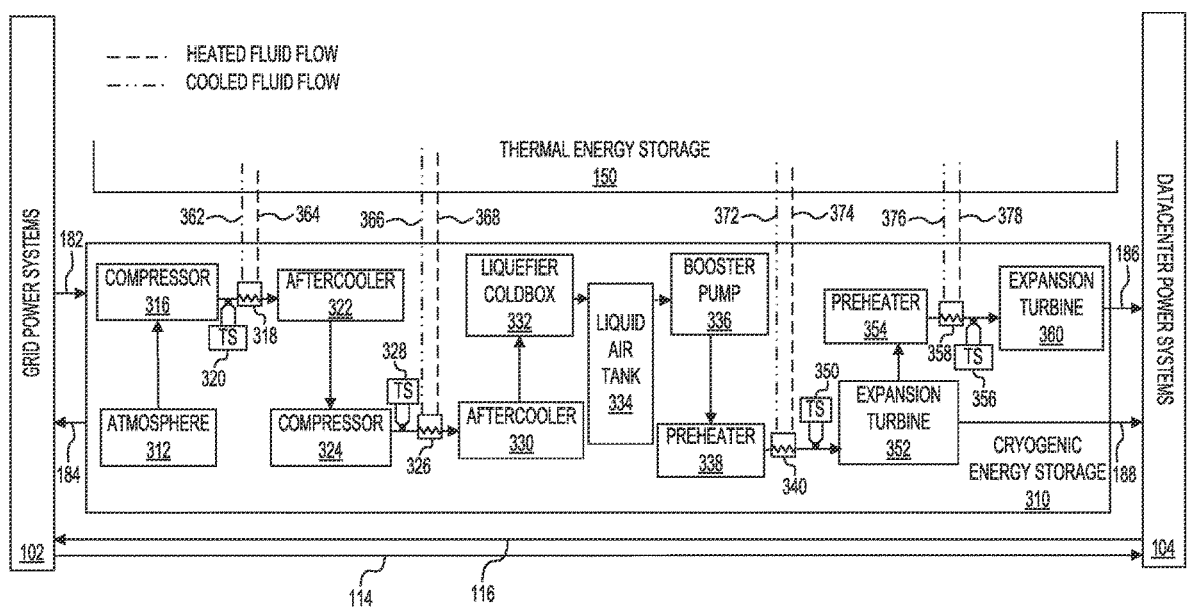
FIG. 3 shows a diagram of a cryogenic energy storage in accordance with one example.

FIG. 3 shows a diagram of a cryogenic energy storage 310 in accordance with one example. Cryogenic energy storage 310 may be coupled to grid power systems 102 to receive electrical power via link 182. In addition, cryogenic energy storage 310 may be coupled to grid power systems 102 via link 184 to allow for grid-interactive actions, including providing power back to the grid. Cryogenic energy storage 310 may further be coupled to datacenter power systems 104 to provide electrical power (e.g., backup electrical power) via links 186 and 188. In this example, cryogenic energy storage 310 may store energy in the form of cryogenically cooled gases, including air or nitrogen. Cryogenic energy storage 310 may include a compressor 316 configured to compress air received via atmosphere 312. The compression process may generate heat, which may be used to heat cooled fluid 362 received from thermal energy storage 150. In this example, the cooled fluid 362 may be received via a pipe and may be heated using heat exchanger 318. Heated fluid 364 may be provided to thermal energy storage 150 via a pipe. A temperature sensor (TS) 320 may be used to sense a temperature of the compressed air. The cooled air may be passed to another compressor 324 via an aftercooler 322. Compression using compressor 324 may generate heat and that may be used to heat cold fluid 366 received from thermal energy storage 150. In this example, the cold fluid 366 may be received via a pipe and may be heated using heat exchanger 326. Heated liquid 368 may be provided to thermal energy storage 150 via a pipe. A temperature sensor (TS) 326 may be used to sense a temperature of the compressed air.

With continued reference to FIG. 3, compressed air (or compressed nitrogen) may be passed onto a liquefier cold-box 332 via aftercooler 330. Liquefier cold-box 332 may generate a liquefied cryogen (e.g., liquid air or liquid nitrogen), which may then be stored in liquid air tank 334. Liquid air (or liquid nitrogen) from liquid air tank 334 may be provided to preheater 338 via a booster circulation pump 336. Whenever there is a need to generate electrical power using cryogenic energy storage 310, booster circulation pump 336 may provide liquid air, which is now in the form of a cryogenic liquid, to preheater 338. The cold generated as a result of this process may be used to cool down heated fluid 374 received from thermal energy storage 150. In this example, the heated fluid 374 may be received via a pipe and may be cooled using heat exchanger 340. Cooled liquid 372 may be provided to thermal energy storage 150 via a pipe. Heated air (or heated nitrogen) may expand in volume and may be used to drive an expansion turbine 352. The efficiency of cryogenic energy storage 310 is enhanced by using the heat from the thermal energy storage to expand the volume of the air (or another gas) used to drive the expansion turbines. A temperature sensor (TS) 350 may be used to sense a temperature of the expanded air (or expanded nitrogen). The electric power generated by expansion turbine 352 may be provided to datacenter power systems 104 or may be used for grid-interactive actions. The expanded air output by expansion turbine 352 may be heated even more using preheater 354. The cold generated as a result of this process may be used to cool down heated fluid 378 received from thermal energy storage 150. In this example, the heated fluid 378 may be received via a pipe and may be cooled using heat exchanger 358. Cooled liquid 376 may be provided to thermal energy storage 150 via a pipe. Heated air (or heated nitrogen) may expand in volume and may be used to drive another expansion turbine 360. A temperature sensor (TS) 356 may be used to sense a temperature of the expanded air (or expanded nitrogen).

Still referring to FIG. 3, cryogenic energy storage 310 may operate in a charge mode or a discharge mode. During the charge mode, heat may be generated as part of the compression operations. During the discharge mode, the stored liquid air may require reheating. Although FIG. 3 shows a certain number of components of cryogenic energy storage 310 arranged in a certain manner, there could be more or fewer number of components arranged differently. As an example, instead of two compressors 316 and 324, only one compressor may be used. Alternatively, more than two compressors may be used. Moreover, instead of compressed air and liquid air, cryogenic energy storage 310 may be configured to process nitrogen, another gas (e.g., liquefied methane), or a combination of gasses.

Figure 4:
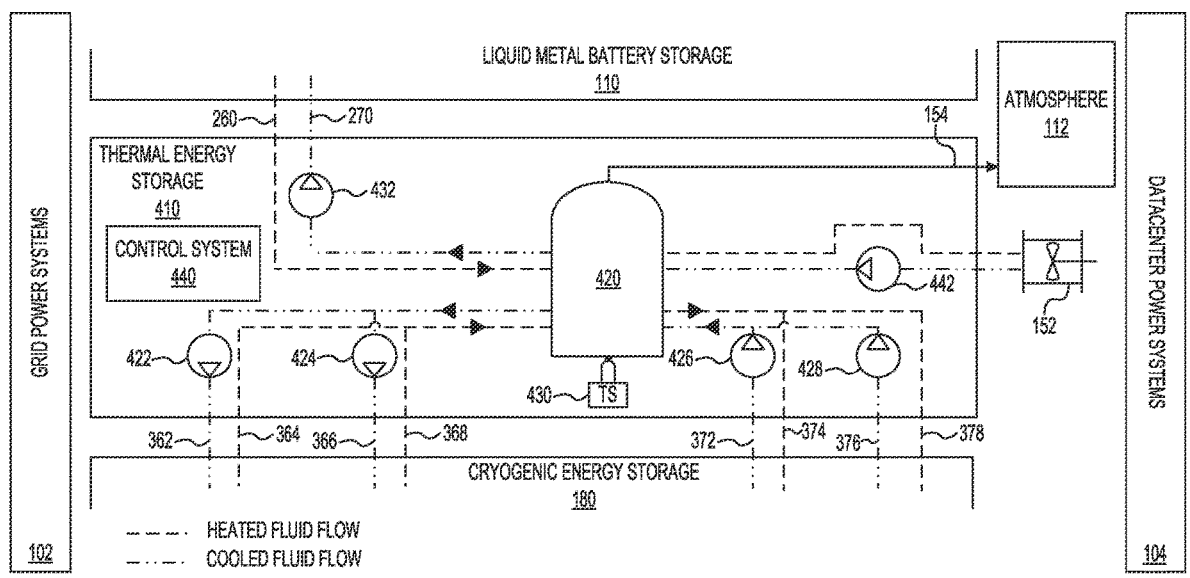
FIG. 4 shows a diagram of a thermal energy storage in accordance with one example.

FIG. 4 shows a diagram of a thermal energy storage 410 in accordance with one example. Thermal energy storage 410 may be implemented as a reservoir that can store excess heat generated by cryogenic energy storage 310 and that can also provide heat either back to cryogenic energy storage 310 or to liquid metal battery storage 210 to heat the battery units. Thermal energy storage 410 may include a storage tank 420 that may act as a hot storage. In one example, hot storage may comprise molten salts stored inside storage tank 420. Storage tank 420 may be insulated to prevent the loss of heat from the hot storage. Thermal energy storage 410 may further include a control system 440, which may control various components in response to sensor data.

With continued reference to FIG. 4, thermal energy storage 410 may include several circulation pumps and pipes and other components to allow for the transfer of heated fluid or cold fluid from thermal energy storage 410. In this example, thermal energy storage 410 may include circulation pumps 422, 424, 426, and 428 for managing the heat exchange with respect to cryogenic energy storage 310 (also referred as cryogenic energy storage 180 in FIG. 1). Several control loops executed by control system 440 (described further with respect to FIG. 5), may allow for the management of the heat exchange. Four control loops (control loops in Tables 1-4) may be associated with the interactions between thermal energy storage 410 and the cryogenic energy storage. Three other control loops (control loops in Tables 5-7) may be associated with the interactions between thermal energy storage 410 and the liquid metal battery storage. Circulation pumps 422 and 424 may be used to recover heat from cryogenic energy storage 310. Table 1 below shows two control loops associated with recovering compression heat from the cryogenic energy storage (CES) during the charge mode. In Table 1 below, $T_0$ corresponds to the temperature of the fluid stored in storage tank 420 (sensed by temperature sensor 430), $T_1$ corresponds to the temperature of the compressed air (or compressed nitrogen) being output by compressor 316 of FIG. 3 (sensed by temperature sensor 320 of FIG. 3), and $T_2$ corresponds to the temperature of the compressed air (or compressed nitrogen) being output by compressor 324 of FIG. 3 (sensed by temperature sensor 328 of FIG. 3). In this example, each of $\Delta T_1$ and $\Delta T_2$ is set at approximately 10 degrees Centigrade.

TABLE 1

Control loop 1: if $(T_1 > T_0 + \Delta T_1)$ and (CES is in charge mode) then turn on circulation pump 422, else turn off circulation pump 422.
Control loop 2: if $(T_2 > T_0 + \Delta T_2)$ and (CES is in charge mode) then turn on circulation pump 424, else turn off circulation pump 424.

Still referring to FIG. 4, circulation pumps 426 and 428 may be used to provide heat to cryogenic energy storage 310 for volumetric expansion used for driving the expansion turbines. Table 2 below shows two control loops associated with reheating the cryogen (e.g., liquid air or liquid nitrogen) associated with the cryogenic energy storage (CES) during the discharge mode. In Table 1 below, $T_0$ corresponds to the temperature of the fluid stored in storage tank 420 (sensed by temperature sensor 430), $T_3$ corresponds to the temperature of the expanded air (or expanded nitrogen) being output by preheater 338 of FIG. 3 (sensed by temperature sensor 350 of FIG. 3), and $T_4$ corresponds to the temperature of the expanded air (or expanded nitrogen) being output by preheater 354 of FIG. 3 (sensed by temperature sensor 356 of FIG. 3). In this example, each of $\Delta T_3$ and $\Delta T_4$ is set at approximately 10 degrees Centigrade.

TABLE 2

Control loop 3: if $(T_3 < T_0 - \Delta T_3)$ and (CES is in discharge mode) then turn on circulation pump 426, else turn off circulation pump 426.
Control loop 4: if $(T_4 < T_0 - \Delta T_4)$ and (CES is in discharge mode) then turn on circulation pump 428, else turn off circulation pump 428.

With continued reference to FIG. 4, in this example, with respect to liquid metal battery storage 110, heat may be transferred to battery units 220, 230, and 240 included in liquid metal battery storage 210 via pipe 260 (similar to pipe 134 of FIG. 1. Battery units 220, 230, and 240 may provide cooled fluid back to thermal energy storage 410 via pipe 270 (similar to pipe 132 of FIG. 1). Battery units may have an operating temperature setpoint depending upon the battery chemistry. In this example, it is assumed that the operating temperature setpoint for the battery units is approximately 500 degrees Centigrade. Due to power loss, battery units may generate heat allowing the battery units to operate without requiring additional heat; however, when the battery units are idle, additional heat may be required to maintain the temperature of the battery units. Battery units may further have a maximum temperature setpoint. In this example, it is assumed that the maximum temperature setpoint for the battery units is approximately 600 degrees Centigrade. Circulation pumps 432 and 442 may be used to manage the temperature set points associated with battery units 220, 230, and 240 of FIG. 2. Table 3 below shows two control loops associated with maintaining the battery units associated with liquid metal battery storage 210 within operating temperature limits. In Table 3 below, $T_0$ corresponds to the temperature of the fluid stored in storage tank 420 (sensed by temperature sensor 430), $T_5$ corresponds to the temperature of the battery units (sensed by temperature sensor 250 of FIG. 2), and $T_{SP}$ corresponds to the operating setpoint temperature of the battery units. In this example, $\Delta T_5$ is set at approximately 10 degrees Centigrade.

TABLE 3

Control loop 5: if $(T_5 > T_{SP})$ and $(T_5 > T_0 + \Delta T_5)$ then turn on circulation pump 432, else turn off circulation pump 432.
Control loop 6: if $(T_5 < T_{SP})$ and $(T_5 < T_0 - \Delta T_5)$ then turn on circulation pump 432, else turn off circulation pump 432.

Still referring to FIG. 4, another circulation pump 442 may be used as part of a control loop to ensure the temperature of the fluid stored in storage tank 420 stays below the maximum temperature setpoint of the battery units. Table 4 below shows a control loop associated with maintaining the temperature of the fluid stored in storage tank 420 below the maximum temperature setpoint of the battery units (e.g., assumed to be 600 degrees Centigrade as part of this example). In Table 3 below, $T_0$ corresponds to the temperature of the fluid stored in storage tank 420 (sensed by temperature sensor 430), $T_{MAX}$ corresponds to the maximum setpoint temperature of the battery units.

TABLE 4

Control loop 7: if ($T_O > T_{MAX}$) then turn on circulation pump 442, else turn off circulation pump 442.

Although FIG. 4 shows a certain number of components of thermal energy storage 410 arranged in a certain manner, there could be more or fewer number of components arranged differently. As one example, thermal energy storage 410 may also include a cold storage. Example cold storage may comprise porous metal structures that once cooled may retain the cold for an extended period of time. Porous metal structures may include lead shots in a reservoir, stainless steel beads in a reservoir, or other like porous metal structures. Since metals have relative high heat capacity, they can be cooled down to very low temperatures by passing gas through them. Cold energy can be recovered from the cooled porous cooled metal structures by passing gas in the other direction such that the cold metal cools gas passing through the porous metal structures. Alternatively, gravel beds may be used as hot and cold energy storages. In addition, although FIG. 4 shows a certain number of circulation pumps that are used as part of certain control loops, fewer or additional pumps with other control loops may also be used.

Figure 5:
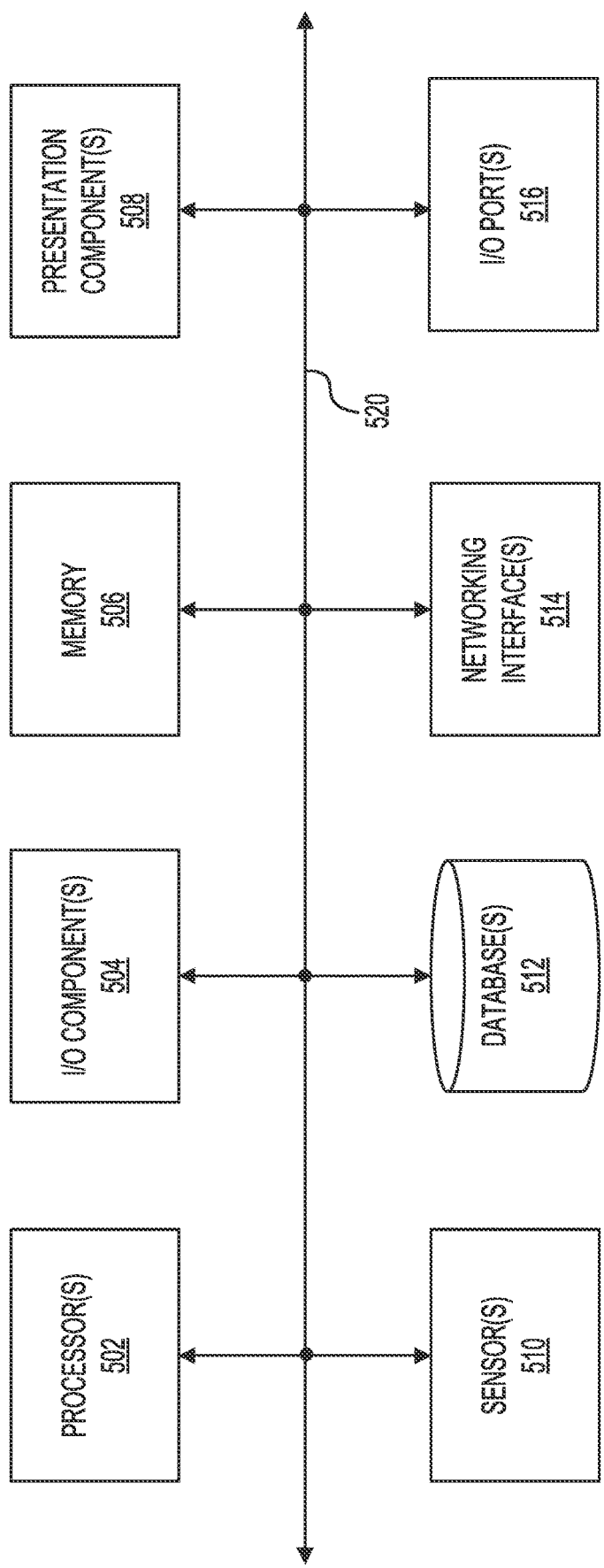
FIG. 5 shows a diagram of a control system for the integrated energy storage system of FIG. 1 in accordance with one example.

FIG. 5 shows a diagram of a control system 500 for the integrated energy storage system 100 of FIG. 1. As an example, control system 500 may be used to implement control system 440 of FIG. 4 to allow for the various control actions associated with sensing and controlling circulation pumps and other components, as needed. Control system 500 may include a processor(s) 502, I/O component(s) 504, memory 506, presentation component(s) 508, sensors 510, database(s) 512, networking interfaces 514, and I/O port(s) 516, which may be interconnected via bus 520. Processor(s) 502 may execute instructions stored in memory 506. Processor(s) 502 may include CPUs, GPUs, ASICs, FPGAs, or other types of logic configured to execute instructions. I/O component(s) 504 may include components such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may include displays, holographic devices, or other presentation devices. Displays may be any type of display, such as LCD, LED, or other types of display. Sensor(s) 510 may include telemetry or other types of sensors configured to detect, and/or receive, information (e.g., conditions associated with the various devices in a data center). Sensor(s) 510 may include sensors configured to sense conditions associated with the various components of integrated thermal energy storage system 100 of FIG. 1. As an example, sensors 510 may include the temperature sensors described previously. In addition, sensors 510 may include pressure sensors, temperature sensors, flow sensors, voltage sensors, current sensors, and other sensors needed to operate integrated energy storage system 100 of FIG. 1, including liquid metal battery storage 110 of FIG. 1, thermal energy storage 150 of FIG. 1, and cryogenic energy storage 180 of FIG. 1, in a safe and efficient manner.

Still referring to FIG. 5, database(s) 512 may be used to store any of the data or files as needed for the performance of methods described herein. Database(s) 512 may be implemented as a collection of distributed databases or as a single database. Network interface(s) 514 may include communication interfaces, such as Ethernet, cellular radio, Bluetooth radio, UWB radio, or other types of wireless or wired communication interfaces. I/O port(s) 516 may include Ethernet ports, Fiber-optic ports, wireless ports, or other communication ports.

Instructions corresponding to various control and management aspects of integrated energy storage system 100 of FIG. 1 may be stored in memory 506 or another memory. These instructions when executed by processor(s) 502, or other processors, may provide at least some of the control and management functionality associated with integrated energy storage system 100. The instructions corresponding to control loops and other aspects associated with integrated energy storage system 100 of FIG. 1, and related components, could be encoded as hardware or software. The functionality associated with control system 500 may be implemented using any appropriate combination of hardware, software, or firmware. Although FIG. 5 shows control system 500 as including a certain number of components arranged and coupled in a certain way, it may include fewer or additional components arranged and coupled differently. In addition, the functionality associated with control system 500 may be distributed or combined, as needed.

Figure 6:
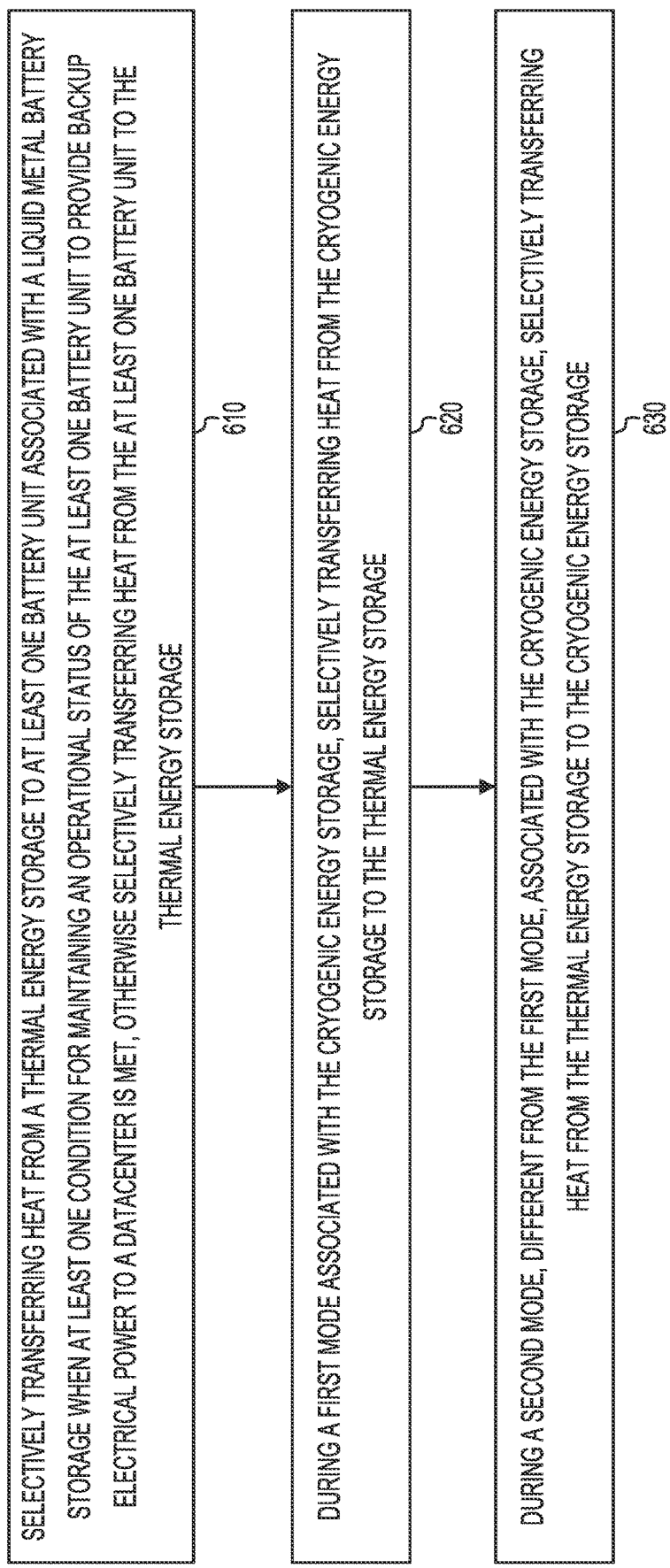
FIG. 6 shows a flowchart of a method associated with the integrated energy storage system including a thermal energy storage integrated with a liquid metal battery storage and a cryogenic energy storage in accordance with one example.

FIG. 6 shows a flowchart 600 of a method associated with integrated energy storage system 100 of FIG. 1 including a thermal energy storage integrated with a liquid metal battery storage and a cryogenic energy storage in accordance with one example. The various steps shown as part of flowchart 600 may be executed by instructions associated with control system 500 described earlier. Step 610 may include selectively transferring heat from the thermal energy storage to the at least one battery unit associated with the liquid metal battery storage when at least one condition for maintaining an operational status of the at least one battery unit in order to provide the backup electrical power to the datacenter is met, otherwise selectively transferring heat from the at least one battery unit to the thermal energy storage. As explained earlier with respect to FIGS. 1-5, integrated energy storage system 100 may allow for selective transfer of heat to the at least one battery unit to heat the battery unit to a temperature that is within an operating temperature limit of the battery unit. Moreover, the heat from the thermal energy storage may be selectively transferred only when the temperature of the fluid being used to transfer heat from the thermal energy storage is sufficiently high to be able to heat the at least one battery unit. Moreover, as explained earlier, heat may be recovered from the liquid metal battery storage including the battery units, as needed.

Step 620 may include during a first mode associated with the cryogenic energy storage, selectively transferring heat from the cryogenic energy storage to the thermal energy storage. As explained earlier with respect to FIGS. 1-5, integrated energy storage system 100 may allow for selective transfer of heat from cryogenic energy storage 180, an example of which is described in detail in FIG. 3, to thermal energy storage 150, an example of which is described in detail in FIG. 4. The first mode may be the charge mode described earlier. During the first mode, the cryogenic energy storage, as described earlier with respect to FIG. 3, may be configured to, using at least one compressor, liquefy a cryogen and generate liquefied cryogen for storage as part of the cryogenic energy storage.

Step 630 may include during a second mode, different from the first mode, associated with the cryogenic energy storage, selectively transferring heat from the thermal energy storage to the cryogenic energy storage. As explained earlier with respect to FIGS. 1-5, integrated energy storage system 100 may allow for selective transfer of heat from thermal energy storage 150, an example of which is described in detail in FIG. 4, to cryogenic energy storage 180, an example of which is described in detail in FIG. 3. The second mode may be the discharge mode described earlier. During the second mode, the cryogenic energy storage, as described earlier with respect to FIG. 3, may be configured to using at least one expansion turbine, generate electric power based on an expansion of the liquefied cryogen.

In conclusion, in one example, the present disclosure relates to an integrated energy storage system including a liquid metal battery storage including at least one battery unit configured to provide backup electrical power to a datacenter. The integrated energy storage system may further include a cryogenic energy storage configured to store energy using a liquefied cryogen. The integrated energy storage system may further include a thermal energy storage, and a control system, coupled to both the liquid metal battery storage and the cryogenic energy storage. The control system may be configured to cause selective transfer of heat from the thermal energy storage to the at least one battery unit associated with the liquid metal battery storage when at least one condition for maintaining an operational status of the at least one battery unit in order to provide the backup electrical power to the datacenter is met. The control system may further be configured to during a first mode associated with the cryogenic energy storage, cause selective transfer of heat from the cryogenic energy storage to the thermal energy storage. The control system may further be configured to during a second mode, different from the first mode, associated with the cryogenic energy storage, cause selective transfer of heat from the thermal energy storage to the cryogenic energy storage.

The at least one condition for maintaining the operational status of the at least one battery unit in order to provide the backup electrical power to the datacenter may comprise heating the at least one battery unit to a temperature equal to or above an operating setpoint temperature associated with the at least one battery unit. The control system may further be configured to monitor temperature of a fluid configured to transfer heat to and from the thermal energy storage and cause the transfer of heat only if needed to maintain the operational status of the at least one battery unit in order to provide the backup electrical power to the datacenter.

The first mode may comprise a charge mode, and where during the first mode, the cryogenic energy storage is configured to, using at least one compressor, liquefy a cryogen and generate liquefied cryogen for storage as part of the cryogenic energy storage. The second mode may comprise a discharge mode, and where during the second mode, the cryogenic energy storage is configured to, using at least one expansion turbine, generate electric power based on an expansion of the liquefied cryogen.

The at least one battery unit may comprise an anode including a calcium alloy and a cathode including antimony. The control system may include a processor, a memory, and a sensor configured to sense the temperature of the fluid.

In another example, the present disclosure relates to a method for operating an integrated thermal energy system comprising: (1) a liquid metal battery storage including at least one battery unit configured to provide backup electrical power to a datacenter, (2) a cryogenic energy storage configured to store energy using a liquefied cryogen, and (3) a thermal energy storage coupled to both the liquid metal battery storage and the cryogenic energy storage. The method may include selectively transferring heat from the thermal energy storage to the at least one battery unit associated with the liquid metal battery storage when at least one condition for maintaining an operational status of the at least one battery unit in order to provide the backup electrical power to the datacenter is met, otherwise selectively transferring heat from the at least one battery unit to the thermal energy storage. The method may further include during a first mode associated with the cryogenic energy storage, selectively transferring heat from the cryogenic energy storage to the thermal energy storage. The method may further include during a second mode, different from the first mode, associated with the cryogenic energy storage, selectively transferring heat from the thermal energy storage to the cryogenic energy storage.

The at least one condition for maintaining the operational status of the at least one battery unit in order to provide the backup electrical power to the datacenter may comprise heating the at least one battery unit to a temperature equal to or above an operating setpoint temperature associated with the at least one battery unit. As part of the method, the selectively transferring heat from the thermal energy storage to the at least one battery unit associated with the liquid metal battery storage may comprise monitoring temperature of a fluid configured to transfer heat to and from the thermal energy storage and transferring heat only if needed to maintain the operational status of the at least one battery unit in order to provide the backup electrical power to the datacenter.

The first mode may comprise a charge mode, and where during the first mode, the cryogenic energy storage is configured to, using at least one compressor, liquefy a cryogen and generate liquefied cryogen for storage as part of the cryogenic energy storage. The second mode may comprise a discharge mode, and where during the second mode, the cryogenic energy storage is configured to, using at least one expansion turbine, generate electric power based on an expansion of the liquefied cryogen. The at least one battery unit may comprise an anode including a calcium alloy and a cathode including antimony.

In yet another example, the present disclosure relates to an integrated energy storage system including a liquid metal battery storage configured to receive electrical power from an electrical grid and provide backup electrical power to a datacenter, where the liquid metal battery storage comprises at least one battery unit configured to provide the backup electrical power when heated to a temperature equal to or above an operating setpoint temperature associated with the at least one battery unit. The integrated energy storage system may further include a cryogenic energy storage configured to receive electrical power from the grid, store energy using a liquefied cryogen, and provide electrical power to the datacenter. The integrated energy storage system may further include a thermal energy storage, and a control system, coupled to both the liquid metal battery storage and the cryogenic energy storage. The control system may be configured to monitor temperature of a fluid configured to transfer heat to and from the thermal energy storage, and if the temperature of the fluid is higher than the operating setpoint temperature associated with the at least one battery unit then selectively turn on a circulation pump associated with the thermal energy storage to transfer heat using the fluid to the at least one battery unit otherwise selectively turn on the circulation pump to transfer heat using the fluid from the at least one battery unit to the thermal energy storage. The control system may further be configured to during a charge mode associated with the cryogenic energy storage, using at least one circulation pump, selectively transfer heat from the cryogenic energy storage to the thermal energy storage. The control system may be configured to during a discharge mode associated with the cryogenic energy storage, using at least one circulation pump, selectively transfer heat from the thermal energy storage to the cryogenic energy storage.

The thermal energy storage may comprise a storage tank including molten salt as a source of heat for the fluid. During the charge mode, the cryogenic energy storage may be configured to, using at least one compressor, liquefy a cryogen and generate liquefied cryogen for storage as part of the cryogenic energy storage. During the discharge mode, the cryogenic energy storage may be configured, to using at least one expansion turbine, generate electric power based on an expansion of the liquefied cryogen.

The control system may be configured to cause either the liquid metal battery storage or the cryogenic energy storage to provide any unutilized electrical power back to the electrical grid as part of grid-interactive services as long as energy storage is maintained to provide the backup electrical power to the data center.

The at least one battery unit may be configured to not provide any electrical power to the datacenter until heated to a temperature equal to or above an operating setpoint temperature associated with the at least one battery unit. The at least one battery unit may comprise an anode including a calcium alloy and a cathode including antimony. The control system may include a processor, a memory, and a sensor configured to sense the temperature of the fluid.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, or the component B may be a sub-component of the component A.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. An integrated energy storage system comprising:
   a liquid metal battery storage including at least one battery unit configured to provide backup electrical power to a datacenter;
   a cryogenic energy storage configured to store energy using a liquefied cryogen; and
   a thermal energy storage, and a control system, coupled to both the liquid metal battery storage and the cryogenic energy storage, wherein the control system is configured to:
      cause selective transfer of heat from the thermal energy storage to the at least one battery unit associated with the liquid metal battery storage when at least one condition for maintaining an operational status of the at least one battery unit in order to provide the backup electrical power to the datacenter is met,
      during a first mode associated with the cryogenic energy storage, cause selective transfer of heat from the cryogenic energy storage to the thermal energy storage, wherein the first mode comprises a charge mode, and wherein during the charge mode, the control system is further configured to, using at least one compressor, liquefy a cryogen and generate liquefied cryogen for storage as part of the cryogenic energy storage, and during a second mode, different from the first mode, associated with the cryogenic energy storage, cause selective transfer of heat from the thermal energy storage to the cryogenic energy storage, wherein the second mode comprises a discharge mode, and wherein during the discharge mode, the control system is further configured to, using at least one expansion turbine, generate electric power based on an expansion of the liquefied cryogen.

2. The integrated energy storage system of claim 1, wherein the at least one condition for maintaining the operational status of the at least one battery unit in order to provide the backup electrical power to the datacenter comprises heating the at least one battery unit to a temperature equal to or above an operating setpoint temperature associated with the at least one battery unit.

3. The integrated energy storage system of claim 2, wherein the control system is further configured to monitor temperature of a fluid configured to transfer heat to and from the thermal energy storage and cause the transfer of heat only if needed to maintain the operational status of the at least one battery unit in order to provide the backup electrical power to the datacenter.

4. The integrated energy storage system of claim 1, wherein the at Fast one battery unit comprises an anode including a calcium alloy and a cathode including antimony.

5. The integrated energy storage system of claim 1, wherein the control system comprises a processor, a memory comprising instructions corresponding to control loops associated with the control system, and a sensor configured to sense the temperature of the fluid.

6. The integrated energy storage system of claim 1, further comprising a first circulation pump and a second circulation pump coupled to the thermal energy storage, wherein the control system is further configured to, during the charge mode, turn on each of the first circulation pump and the second circulation pump allowing for a recovery of compression heat from the cryogenic energy storage.

7. The integrated energy storage system of claim 6, further comprising a third circulation pump and a fourth circulation pump coupled to the thermal energy storage, wherein the control system is further configured to, during the discharge mode, turn on each of the third circulation pump and the fourth circulation pump allowing for a reheating of the cryogen.

8. A method for operating an integrated thermal energy system comprising: (1) a liquid metal battery storage including at least one battery unit configured to provide backup electrical power to a datacenter, (2) a cryogenic energy storage configured to store energy using a liquefied cryogen, (3) a thermal energy storage coupled to both the liquid metal battery storage and the cryogenic energy storage, and (4) a control system associated with the integrated thermal energy system, the method comprising:

selectively transferring heat from the thermal energy storage to the at least one battery unit associated with the liquid metal battery storage when at least one condition for maintaining an operational status of the at least one battery unit in order to provide the back p electrical power to the datacenter is met, otherwise selectively transferring heat from the at least one battery unit to the thermal energy storage;

during a first mode associated with the cryogenic energy storage, selectively transferring heat from the cryogenic energy storage to the thermal energy storage, wherein the first mode comprises a charge mode, and wherein during the first mode, the control system is configured to, using at least one compressor, liquefy a cryogen and generate liquefied cryogen for storage as part of the cryogenic energy storage; and during a second mode, different from the first mode, associated with the cryogenic energy storage, selectively transferring heat from the thermal energy storage to the cryogenic energy storage, wherein the second mode comprises a discharge mode, and wherein during the second mode, the control system is configured to, using at least one expansion turbine, generate electric power based on an expansion of the liquefied cryogen.

9. The method of claim 8, wherein the at least one condition for maintaining the operational status of the at least one battery unit in order to provide the backup electrical power to the datacenter comprises heating the at least one battery unit to a temperature equal to or above an operating setpoint temperature associated with the at least one battery unit.

10. The method of claim 9, wherein selectively transferring heat from the thermal energy storage to the at least one battery unit associated with the liquid metal battery storage comprises monitoring temperature of a fluid configured to transfer heat to and from the thermal energy storage and transferring heat only if needed to maintain the operational status of the at least one battery unit in order to provide the backup electrical power to the datacenter.

11. The method of claim 8, wherein the at least one battery unit comprises an anode including a calcium alloy and a cathode including antimony.

12. The method of claim 8, wherein the integrated energy storage system further comprises a first circulation pump and a second circulation pump coupled to the thermal energy storage, and wherein the method further comprises, during the charge mode, turning on each of the first circulation pump and the second circulation pump allowing for a recovery of compression heat from the cryogenic energy storage.

13. The method of claim 12, wherein the integrated energy storage system further comprises a third circulation pump and a fourth circulation pump coupled to the thermal energy storage, and wherein the method further comprises turning on each of the third circulation pump and the fourth circulation pump allowing for a reheating of the cryogen.

14. An integrated energy storage system comprising:

a liquid metal battery storage configured to receive electrical power from an electrical grid and provide backup electrical power to a datacenter, wherein the liquid metal battery storage comprises at least one battery unit configured to provide the backup electrical power when heated to a temperature equal to or above an operating setpoint temperature associated with the at least one battery unit;

a cryogenic energy storage configured to receive electrical power from the grid, store energy using a liquefied cryogen, and provide electrical power to the datacenter; and a thermal energy storage, and a control system, coupled to both the liquid metal battery storage and the cryogenic energy storage, wherein the control system is configured to:

monitor temperature of a fluid configured to transfer heat to and from the thermal energy storage, and if the temperature of the fluid is higher than the operating setpoint temperature associated with the at least one battery unit then selectively turn on a circulation pump associated with the thermal energy storage to transfer heat using the fluid to the at least one battery unit, otherwise selectively turn on the circulation pump to transfer heat using the fluid from the at least one battery unit to the thermal energy storage, during a charge mode associated with the cryogenic energy storage, using at least one circulation pump, selectively transfer heat from the cryogenic energy storage to the thermal energy storage, wherein during the charge mode, the control system is further configured to, using at least one compressor, liquefy a cryogen and generate liquefied cryogen for storage as part of the cryogenic energy storage, and during a discharge mode associated with the cryogenic energy storage, using at least one circulation pump, selectively transfer heat from the thermal energy storage to the cryogenic energy storage, wherein during the discharge mode, the control system is further configured to, using at least one expansion turbine, generate electric power based on an expansion of the liquefied cryogen.

15. The integrated energy storage system of claim 14, wherein the thermal energy storage comprises a storage tank including molten salt as a source of heat for the fluid.

16. The integrated energy storage system of claim 14, wherein the control system is configured to cause either the liquid metal battery storage or the cryogenic energy storage to provide any unutilized electrical power back to the electrical grid as part of grid-interactive services as long as energy storage is maintained to provide the backup electrical power to the data center.

17. The integrated energy storage system of claim 14, wherein at least one battery unit is configured to not provide any electrical power to the datacenter until heated to a temperature equal to or above an operating setpoint temperature associated with the at least one battery unit.

18. The integrated energy storage system of claim 14, wherein the at least one battery unit comprises an anode including a calcium alloy and a cathode including antimony.

19. The integrated energy storage system of claim 14, wherein the control system comprises a processor, a memory comprising instructions corresponding to control loops associated with the control system, and a sensor configured to sense the temperature of the fluid.

20. The integrated energy storage system of claim 14, wherein the control system comprises a processor and a memory comprising instructions corresponding to control loops associated with the control system.

* * * * *